United States Patent [19]

Yapp

[11] 4,267,704

[45] May 19, 1981

[54] TIMING CIRCUIT FOR AIR CONDITIONER CHILLER

[76] Inventor: Jack Yapp, 11338 Yearling, Cerritos, Calif. 90701

[21] Appl. No.: 10,891

[22] Filed: Feb. 9, 1979

[51] Int. Cl.³ .............. G05D 23/32; F04B 49/00
[52] U.S. Cl. .................................. 62/158; 62/228; 417/12; 417/290
[58] Field of Search ............... 236/46 F; 62/158, 157, 62/228 C; 417/12, 290, 317

[56] References Cited

U.S. PATENT DOCUMENTS

| 3,499,297 | 3/1970 | Ruff et al. | 62/228 B |
| 3,668,883 | 6/1972 | Ruff et al. | 62/158 |
| 4,028,593 | 6/1977 | Newell | 62/158 |
| 4,060,997 | 12/1977 | Shultz et al. | 62/180 |
| 4,152,902 | 5/1979 | Lush | 62/157 |

Primary Examiner—William E. Wayner
Assistant Examiner—Harry Tanner
Attorney, Agent, or Firm—Fulwider, Patton, Rieber, Lee & Utecht

[57] ABSTRACT

A timing circuit is coupled to control operation of a chiller system in an air conditioner. The timing circuit includes an initial timer to limit to a minimum the amount of coolant initially admitted to an air conditioner compressor upon startup. This drastically lowers the initial amperage demand by the compressor. A chilled water return sensor monitors the temperature of water as it returns to thermal contact with the air conditioner coolant. The return sensor operates a duty cycle timer to intermittently load a line that serves to increase the supply of coolant to the air conditioner compressor. This lowers the average amperage demand of the air conditioning system.

17 Claims, 6 Drawing Figures

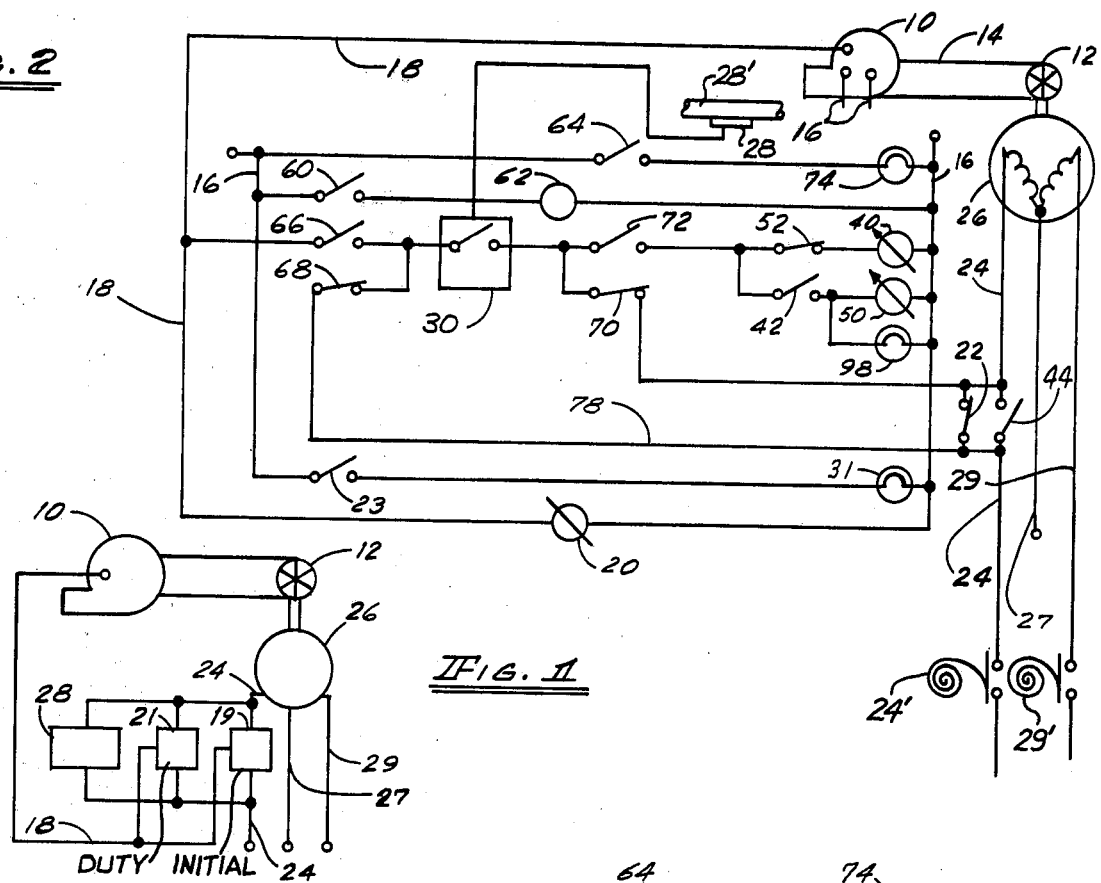
Fig. 2
Fig. 1
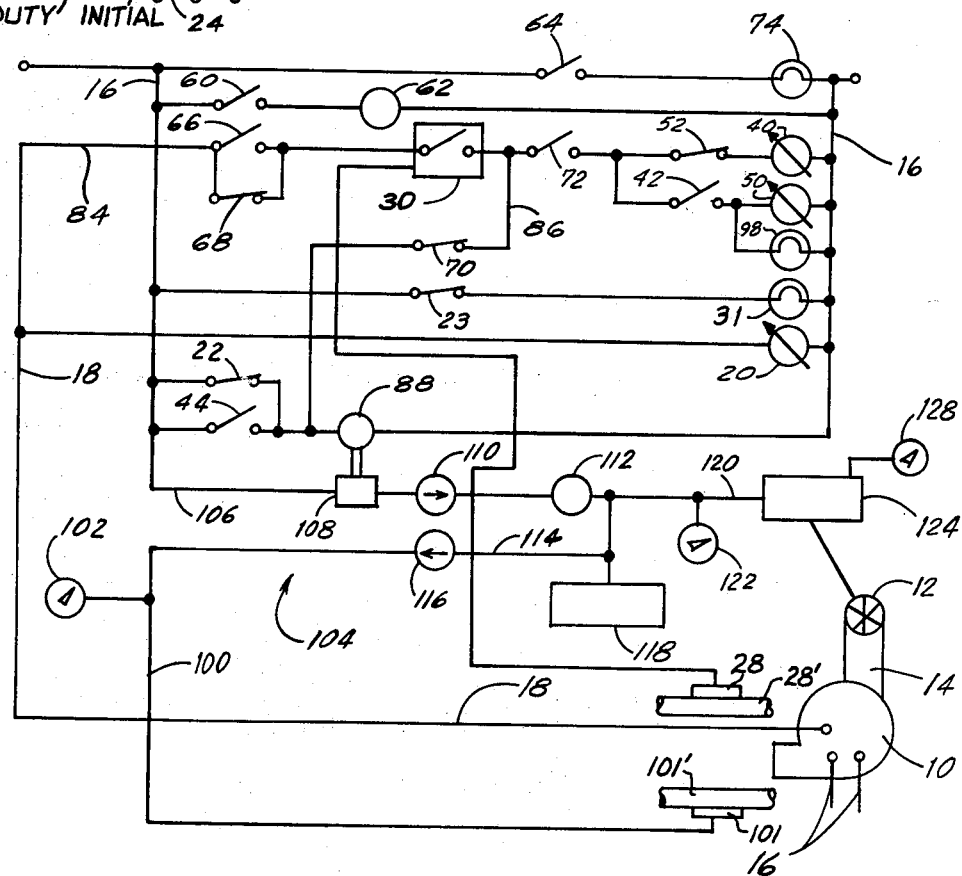
Fig. 3

TIMING CIRCUIT FOR AIR CONDITIONER CHILLER

BACKGROUND OF THE INVENTION

1. Field of the Invention

The present invention relates to control systems for air conditioners that utilize a compressor to compress coolant to cool a recycling heat transfer fluid, where the heat transfer fluid in turn is used to cool ambient air.

2. Description of the Prior Art

Most commercial building air conditioning systems employ one or more centrifugal compressors which compress a coolant, such as freon. The coolant is passed through a line into thermal contact with a recycling heat transfer fluid, such as water. The coolant is allowed to expand thereby cooling the water. The water is cycled through a radiator system, past which air to be cooled is blown. The water cools the air and then returns to thermal contact with the air conditioner coolant to give up the heat absorbed from the air. Cooling of the ambient air thus proceeds in recycling fashion. Because of the use of water as an intermediate recycling heat transfer fluid, such air conditioning systems are referred to as chilled water air conditioners, or chiller air conditioning systems.

Control of the amount of heat removed from ambient air in a chiller air conditioning system is effectuated by regulating the amount of coolant supplied to the centrifugal compressor. Coolant is usually forced through a system of vanes, which can be opened or closed to an adjustable degree depending upon the amount of coolant to be supplied to the compressor. As the vanes are opened, a greater amount of coolant is supplied to the compressor, and hence cooling capacity is increased. Closing the vanes limits the amount of coolant supplied to the compressor, and thereby reduces the degree to which the air conditioning system cools the ambient air.

When commercial chiller air conditioning systems are initially turned on, they initially place a huge power demand on the commercial electrical utility which supplies power for operation. In a typical system that normally draws approximately 125 amps once it has reached normal running conditions, there is an initial 280 amp surge as measured over the initial 15 minute interval that the system is turned on. This initial power surge represents a unnecessary power drain and inordinately increases electrical power consumption by the air conditioning system. Moreover, public utilities must construct and maintain adequate facilities to service such peak power loads, even though these loads fall off sharply after the initial start-up period. As a result, public utilties are forced to construct power plants adequate to service such large initial loading. Furthermore, because of the high initial loading, customers utilizing conventional chiller air conditioning systems are billed for electrical service at a rate reflecting the high electrical load demand that the initial supply of power to the systems requires, rather than the lower average power demand of the air conditioning system.

A further characteristic of conventional commercial chiller air conditioning systems is that they are controlled in response to the temperature of the chilled water as it leaves thermal contact with the coolant. As a result, there is a considerable amount of overshooting and undershooting of actual room temperature. This leads to an inordinately high average power demand by the air conditioning system. Furthermore, in conventional chiller air conditioning systems the vanes admitting the supply of coolant to the compressor are adjusted in the same fashion regardless of whether the supply of coolant is being increased or decreased. This likewise leads to an inordinately high average power demand by the air conditioning system.

SUMMARY OF THE INVENTION

The present invention is designed to sharply reduce the initial high power demand of a chiller air conditioning system as it is first started up, and to reduce the average power requirement of such a system over prolonged operation. The initial power demand is reduced utilizing the present invention by employing an initial timing means to control the vanes that admit coolant to the compressor. This initial timing system responds to a signal that indicates that the compressor is on line and running by establishing an initial timing interval during which the vanes are allowed to remain open to admit a minimum amount of coolant to the compressor. After this initial timing interval has elapsed, the initial timer closes the vanes so that as the system powers up, the compressor is operating under a very light load.

Following operation of the initial timer, the system thereafter responds to a chilled water return sensor. This return sensor monitors the temperature of the water returning to thermal contact with the coolant, rather than the temperature of the chilled water leaving thermal contact with the coolant as in conventional systems. This makes the system much more responsive to actual temperature conditions within the building to be cooled than is achieved in air conditioning systems currently in use. Furthermore, in loading the air conditioning system by increasing the supply of coolant to the compressor, signals directing the vanes to open are not supplied continuously according to the present invention, but rather are supplied incrementally. This smooths the electrical power drain by the compressor considerably, since increases in coolant to the compressor are supplied in small increments, rather than in massive surges. The compressor is thereby able to operate more efficiently, and as a result draws less power over prolonged operation.

In contrast to controlling increased loading of the compressor using intermittent signals, using the invention, unloading of the compressor is allowed to proceed in accordance with a direct continuous signal. Overcooling is thereby avoided and this further smooths fluctuations in the power consumption of the compressor.

In conventional chiller air conditioning systems, adjustment to the inlet vanes through which coolant flows to the compressor is controlled either electrically or pneumatically. In electrically controlled systems, a vane motor is employed to turn the vanes as required to regulate the supply of coolant to the compressor. The vane motor is a reversible motor and includes separate load and unload lines to operate the motor to open or close the vanes respectively. In a pneumatic vane control, on the other hand, air pressure is applied through a pneumatic pilot line to a pneumatic piston to control the degree to which the inlet vanes are opened to admit coolant to the compressor. The air pressure in the pneumatic pilot line is proportional to the temperature of chilled water leaving thermal contact with the coolant. Normally, the control operates to provide a pressure signal directly proportional to this temperature. Therefore, as temperature increases the pilot pressure likewise increases and operates to open the inlet vanes to admit more coolant to chill the recycling water further. Conversely, when the temperature of the chilled water leaving thermal contact with the coolant falls below a set point, pressure is reduced to allow the vanes to close, and thus reduce the coolant supply to the compressor.

The invention may be described with greater clarity and particularly by reference to the accompanying drawings.

DESCRIPTION OF THE DRAWINGS

FIG. 1 is a block diagram of the timing control of the invention. FIG. 2 is a schematic diagram of the timing control of the invention applied to a chiller air conditioning system with an electric vane motor.

FIG. 3 is a schematic diagram of the timing control of the invention applied to a chiller air conditioning system with a pneumatic vane control.

DESCRIPTION OF THE EMBODIMENTS

Figure 5:
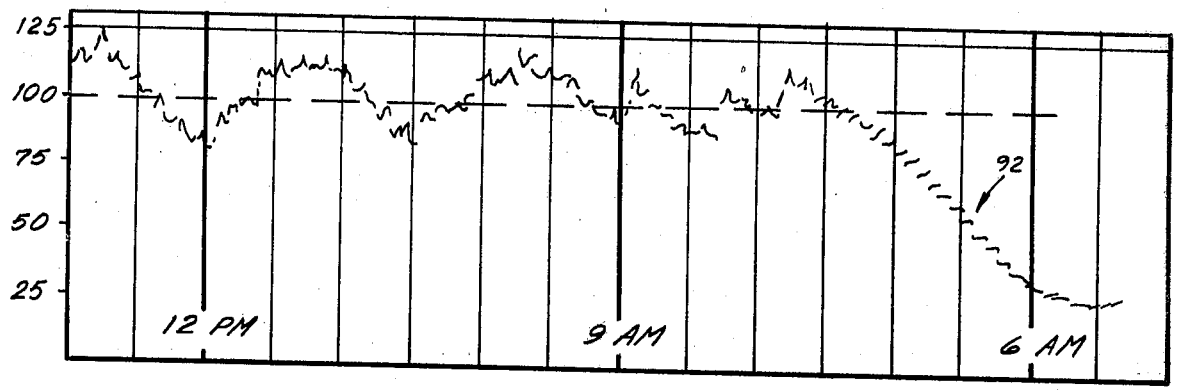
FIG. 5 is a graph of electrical power consumption of the same air conditioning system of FIG. 4, but employing the timing control of the invention.

FIG. 1 illustrates the embodiment of FIG. 2 in block diagram form. With reference to FIG. 1, a vane control motor 26 is shown with a load line 24, an unload line 29, and a common neutral line 27. The novel timing circuit of the invention may be added onto an existing cooling control system which employs conventional temperature limit controls to open and close the load line 24 and the unload line 29 through, for example, conventional bimetallic contacts 24' and 29' respectively. The timing circuit of the embodiment depicted in FIG. 1 does not effect the operation of the bimetallic contacts 24' and 29'. A signal on line 24 will operate to open vanes 12 to admit coolant to a compressor 10, while a signal on the unload line 29 will operate to close the vanes 12 to reduce the amount of coolant directed to the compressor 10. A chilled water return sensor 28 is coupled to monitor temperature or recycling water in a return conduit 28' into compressor 10 as the recycling water returns to thermal communication with the coolant cycling through the compressor 10. The return sensor 28 operates a switch 30 associated therewith. The return sensor switch 30 is coupled in the load line 24. An initial timer 19 is also connected in the load line 24, as is a duty cycle timer 21. The duty cycle timer 21 is operative in response to signals from the return sensor 28 corresponding to temperatures above a set point temperature to intermittently increase the opening of the vanes 12. The duty cycle timer 21 is inoperative in response to signals from the return sensor 28 corresponding to temperatures below the set point temperature. The initial timer 19 is responsive to initial power loading of the compressor 10 to allow the vanes 12 to open slightly and then to halt the opening of the vanes 12 to limit coolant supply to the compressor 10 to a minimum. The transition between opening and cessation of opening occurs after an initial timing interval.

FIG. 2 illustrates a timing circuit for an air conditioner compressor 10 for compressing a coolant to cool a recycling heat transfer fluid, such as chilled water. The system employs a network of vanes, indicated diagrammatically at 12, which are located in a tubular inlet 14 to the air conditioner compressor 10. The vanes 12 govern the supply of coolant that is allowed to reach the compressor 10. The vanes 12 may be opened to increase the coolant supply through the inlet 14 or closed to reduce the coolant supply to the compressor 10. The coolant circulates from the outlet of the compressor 10, passes into thermal contact with the chiller water to cool it, and returns to the compressor 10 through the vanes 12 and inlet 14. This circulation and heat exchange system is conventional and has not been depicted.

The compressor 10 is operated from commercial a.c. power by power leads indicated at 16. A run indication signal line 18 extends from the compressor 10 and carries an electrical run indication signal during compressor operation.

The circuits of FIGS. 2 and 3 both include the initial timer 19 of FIG. 1, which includes a startup relay with a coil indicated at 20 and with contacts indicated at 22 and 23. The startup relay coil 20 is responsive to initial power loading of the compressor 10 by a connection to the run indication signal line 18. The startup relay is a slow to operate relay, so that the contacts 22 remain closed following startup of the compressor 10 during an initial timing interval. During this timing interval the normally closed contacts 22 complete a path in the load line 24 leading to the vane control motor 26. The load line 24 powers the vane control motor 26 to open the vanes 12 during the initial timing interval until the startup relay operates. However, at the termination of the timing interval the startup relay operates to open its contacts 22 to open the load line 24 and halt the movement of the vanes 12 so that they do not open further.

The startup relay contacts 23 are normally open until the startup relay is actuated. Once the initial timing interval has elapsed, however, the startup relay coil 20 closes the contacts 23 to illuminate a bypass indication light 31. The presence of this light indicates that the contacts 22, which bypass the duty cycle timer 21, are open.

The return sensor 28 is coupled to monitor the temperature of chilling water in the return conduit 28' as it returns to thermal communication with the air conditioning coolant. The chilling water is cold as it leaves thermal contact with the system coolant, but passes through a radiator system past which ambient air for a building is circulated. The cooling water absorbs heat from the ambient air, at the same time chilling the air. The cooling water returns through return conduit 28' to thermal contact with the coolant, and its increased temperature is monitored by the return sensor 28 before it reaches the coolant. The return sensor 28 is coupled to an electrical switch 30 that closes when the monitored temperature rises above a set point temperature of the returning water. The switch 30 is otherwise open.

The duty cycle timer 21 of the invention includes first and second timing relays. The coil of the first timing relay is indicated at 40 and the coil of the second timing relay is indicated at 50. The contacts of the first timer relay 40 are indicated at 42 and 44, while the contacts of the second timing relay 50 are indicated at 52. Together the first and second timer relays function as a duty cycle timing means and are operative in response to signals from the return sensor 28 to periodically open and close the vanes 12. During the time that the contacts 42 are closed, and prior to the elapse of the second delay interval, a load indication light 98, coupled in parallel with the coil 50 of the second timer relay of the duty cycle timer 21, will be illuminated and will indicate that the vane motor 26 is being driven to open the vanes 12. The first and second timer relays are inoperative in response to an open circuit condition of the return sensor switch 30, which corresponds to temperatures below the set point temperature.

The timing circuit of the invention is connected to the commercial 120 volt 60 cycle a.c. power lines 16, as illustrated in FIGS. 2 and 3. A key switch 60 is provided across the lines 16. A main relay is provided with its coil 62 connected in series with the key switch 60. The main relay includes several sets of contacts operated by the coil 62 and indicated in their normal conditions with the key switch 60 open at 66, 68, 70 and 72. A visual indicator light bulb 74 is connected in series with the main relay contacts 64 across the a.c. lines 16, as depicted. The indicator bulb 64 thereby operates with actuation of the key switch 60 to indicate when the timing circuit of the invention has been enabled by the key switch 60. The main relay contacts 68 and 70 in FIG. 2 are normally closed when the key switch 60 is open so that the return sensor 28 remains connected to the load line 24 in FIG. 2 by closure of the connecting leads 78 and 80 when the key switch 60 is open. This allows the return sensor 28 to function whether or not the timing circuit of the invention is in use. When the key switch 60 is closed, the normally open main relay contacts 66 and 72 likewise keep the return sensor 28 in circuit.

Similarly, and with reference to FIG. 3, the main relay contacts 68 and 70 are normally closed and complete connections through connecting leads 84 and 86 to couple the return sensor 28 in circuit to a solenoid 88, the operation of which will hereinafter be described. When the key switch 60 is opened in FIG. 2, the return sensor 28 is likewise maintained in circuit by the main relay contacts 66 and 72.

In the embodiment of FIG. 2, the first and second timer relay coils 40 and 50 are connected in opposing parallel circuits as indicated. When the second timer relay contacts 52 are closed, the coil 40 of the first timer relay is enabled, but that relay is purposefully slow to activate, so that the contacts 42 and 44 remain open for a first delay interval after the switch 30 of the return sensor 28 closes. As a consequence, even though the return sensor 28 is calling for opening of the vanes 12, the load line circuit 24 will not be completed through the contacts 44 to allow the vanes 12 to open until after the first timer relay has timed out at the end of the first delay interval. When the first timer relay does time out, however, the contacts 44 are closed to complete the load circuit, and at the same time the contacts 42 are closed to enable the coil 50 of the second timer relay.

The second timer relay is likewise purposefully slow to act. As a consequence, the contacts 52 are not immediately closed, but instead remain open for a second delay interval. At the end of the second delay interval, the contacts 52 close again enabling the first timer relay coil 40, and the process is cyclically repeated. As a result, a call for an increase in coolant by the return sensor 28 is not answered by a continuous signal, as in conventional control circuits. Rather, a series of pulses to the vane motor 26 are produced to open the vanes 12 in increments. This prevents a sudden surge of coolant into the compressor 10 and allows the compressor 10 to operate with much greater efficiency.

Figure 4:
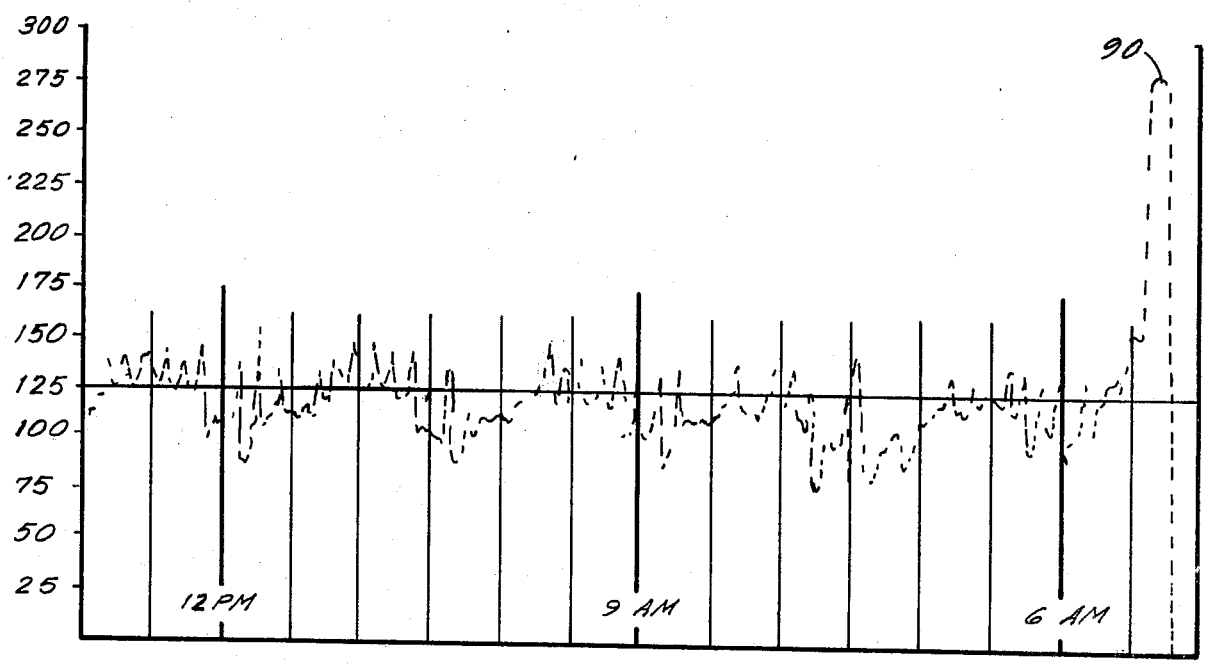
FIG. 4 is a graph depicting power consumption of a commercial air conditioning system without the timing control of the invention.

FIG. 4 illustrates operation of the compressor 10 with a conventional air conditioner control circuit. In a conventional air conditioner control system, a sensor is positioned in place of the relay contacts 44 of FIG. 2, and the remainder of the electrical control circuitry to the left of the load line 24, the common line 27 and the unload line 29 in FIG. 2 is absent. Also, in conventional air conditioner control systems the sensor connected in circuit with the load line 24 monitors the temperature of the chilled water as it leaves thermal contact with the coolant. Such a sensor is typically adjusted to a set point of 45 degrees F. A temperature rise above 45 degrees F. will close the circuit to the load line 24 to open the vanes 12. When the temperature drops below this set point, a circuit is completed to the unload line 29 to close the vanes 12. Moreover, when the system is initially powered up, there will be a continuous signal on the load line 24 until the chilled water leaving thermal contact with the coolant drops to 45°. This produces a very substantial power surge, depicted at 90 in FIG. 4. It can be seen that the power surge reaches 280 amps and remains at a level exeeding 125 amps for more than one half an hour after initial power on. In contrast, with the timing circuit of FIG. 2, the same air conditioning system never creates a power demand greater than 125 amps, as illustrated in FIG. 5. The initial retardation of the supply of coolant and the slow rise in the power drain, indicated at 92 in FIG. 5, is attributable to the action of the initial timing relay with its coil connected at 20 and its contacts connected as indicated at 22 and 23 in FIG. 1.

A further feature of significance which can be observed by a comparison of FIGS. 4 and 5 is the rather substantial and rapid current demand fluctuations in the prior art control system without the timing circuitry of the invention. From FIG. 4, it is apparent that the average current demand without the timing circuit of the invention is approximately 125 amps. In contrast, it is apparent from FIG. 5 that with the control circuitry of the invention, the same air conditioning system never draws more than 125 amps and the average current demand is about 104 amps when the system operates over a prolonged period of time. This is attributable to the action of the duty cycle timer relays having coils connected at 40 and 50, as depicted in FIG. 1. The first timer relay contacts are connected at 42 and 44, while the second timer relay contacts are indicated at 52.

The startup or initial timing relay having a coil indicated at 20 and contacts at 22 and 23 may be a model MET-0-100-120A Guardian relay, manufactured and sold by the Guardian Company of Gardena, Calif. The first duty cycle timer relay having a coil 40 and contacts 42 and 44 may be a Model MET-0-300-120A and the second duty cycle timer relay having a coil 50 and contacts 52 may be a Model MET-0-015-12A, both also manufactured and sold by the same company. The main relay having a coil 62 and contacts 64–72 may be a three pole, triple pole, double throw, 124 volt Guardian relay, manufactured by the same company. A suitable sensor which can be used to function as the chilled water return sensor 28 is a Model T-675-1508 Honeywell Temperature Sensor, 0–100 degrees F., plus or minus three degrees, manufactured by Honeywell Controls of Minneapolis, Minn. The return sensor 28 will typically be adjusted to a setpoint temperature of 54° F.

Preferably, both the startup relay and the timer relays include adjustment pots. The adjustment pot of the startup relay alters the initial timing interval, preferably between about 0.5 and 100 seconds. The adjustment pot of the first timer relay adjusts the first delay interval, preferably between about 100 and 300 seconds, while the adjustable pot of the second timer relay adjusts the second delay interval between about 0.5 and 15 seconds.

Figure 6:
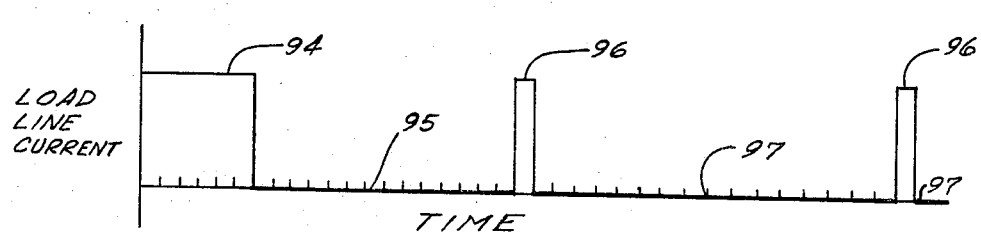
FIG. 6 is a timing diagram illustrative of operation of the embodiments of FIGS. 2 and 3.

FIG. 6 is a timing diagram useful in explaining the operation of the invention. Upon power on to the compressor 10, a signal is produced on the run indication signal line 18. This activates the initial timer 19 by enabling the coil 20 of the startup relay. The contacts 22 of the startup relay 20 do not open immediately, however, so that load current is supplied to the vane motor 26 for a period of perhaps 30 seconds. This load condition is depicted by the load level 94 in FIG. 6. Once the startup relay times out, the contacts 22 open.

Upon receipt of the run indication signal 18, the return sensor 28 will close, assuming that the water returning to thermal contact with the coolant is above 54° F. With the contacts 66, 30 and 72 closed, the coil 40 of the first timing relay in the duty cycle timer 21 is enabled. The first delay interval associated with this relay may be established, for example, at 200 seconds. Until this first delay interval elapses, the contacts 44 will remain open. This means that once the initial timing interval 94 has elapsed, the load line 24 will go open for a period of time until the first delay interval has elapsed. At that time, the contacts 42 and 44 both close, and a signal is passed to the vane motor 26 on the load line 24. This signal lasts for the duration of the second delay interval, established by adjustment of the pot of the second timer relay and indicated at 96 in FIG. 6. This interval may, for example, be 10 seconds. Thereafter, recurring pulses 96 will occur for 10 seconds in duration each, with 190 second lapses between the end of one pulse 96 and the start of the next. The open circuit condition of the load line 24 between pulses 96 is indicated at 97 in FIG. 6.

As previously noted, the durations of all of the load signals 94 and 96, and the intervals 95 and 97 between these signals can be adjusted by turning the adjustable pots of the startup and timer relays. Each air conditioning system will typically exhibit a minimum power demand when the startup interval and the first and second delay intervals are properly adjusted. This is determined by empirical testing and correction.

During the initial timing interval, the contacts 23 connected across the power lines 16 remain closed so that the by-pass indication light 31 is illuminated, signalling an observer that the control circuit of the invention is not yet in operation. Once the initial timing interval has elapsed, however, the startup relay contacts 22 and 23 open and the bypass light 31 is extinguished. This signals to an observer that the timing circuit of the invention is in operation.

An initial activation of the circuit of the invention is effectuated by closure of the switch 60. This operates the main relay to reverse the main relay contacts 64–72 from the positions indicated in FIG. 2, and to illuminate the on light indicator 74 so that an observer is aware that the circuitry of the invention is in operation.

It should be noted that the unload line 29 is not controlled by the circuitry of the invention. When the temperature of the return water drops below the set point of another return sensor (not depicted), there is no interference with an unloading signal which closes bimetallic contact 29' on line 29 to close the vanes 12. By controlling the load line 24 with the circuit of the invention, and by leaving a direct connection from a chilled water return sensor to the unload line 29, a smooth power demand profile, as depicted in FIG. 5, is achieved.

The embodiment of FIG. 3 is similar in many respects to that of FIG. 2, and the operation of the contacts and switches of common circuitry and circuit elements depicted therein is identical. It should be noted, however, that in the embodiment of FIG. 3, opening and closing of the vanes 12 is under pneumatic control, not the control of an electric motor 26 as in FIG. 1. In the embodiment of FIG. 3 a pneumatic pilot line 100 is coupled to a cooling sensor 101 for monitoring inlet temperature of the recycling water as it leaves thermal contact with the coolant, through conduit 101', and for providing an output pressure on line 100 proportional to that temperature. This output pressure is coupled to the pilot line 100, which is monitored by a gauge 102 that is allowed to vary between 1 and 20 psi.

The pilot line 100 is connected to a pneumatic control loop 104. One line 106 of the control loop 104 includes a gate valve 108 to open and close the control loop 104, a check valve 110 to limit flow to the direction indicated, and an adjustable restriction valve 112. The other line 114 of the control loop 104 includes a check valve 116 to limit flow to the direction indicated. A pneumatic buffer 118, in the form of an air tank is connected to the pneumatic control loop 104 to dampen pressure surges in the system.

The control loop 104 is connected to a pneumatic outlet line 120, monitored by a pneumatic gauge and relief valve 122 to ensure pressure within a range of 1 to 20 psi. The pneumatic outlet 120 is connected to pneumatic piston 124. Reciprocal movement of the piston 124 opens and closes the vanes 12. The piston 124 is coupled to the vanes 12 by conventional mechanic linkage. A pressure relief valve 128 is provided for the piston 124.

In the operation of the embodiment of FIG. 2, and upon enablement by closure of the key switch 60, a.c. current on the lines 16 is provided to the coil 20 of the startup relay. After the initial timing interval 94, depicted in FIG. 6, the startup relay opens its contacts 22 and closes its contacts 23, thereby operating the solenoid 88 to close the gate valve 108. Prior to closure of the gate valve 108, pressure from the pilot line 100 acts through the gate valve 108, check valve 110 and the restriction valve 112 to build up a slight pressure in the loop 104. This pressure acts upon the piston 124 to open the vanes 12 to a limited degree. This allows a minimum amount of coolant to reach the compressor 10, as with the embodiment of FIG. 1. Once the startup relay has operated, however, no further pressure is admitted through the gate valve 108 and the vanes 12 remain immobile in the position to which they have been moved.

The run indication signal on the run indication signal line 18 acts through the closed contacts 66 and 72 of the main relay to allow the return sensor 28 to enable the coil 40 of the first timer relay of the duty cycle timer 21 of FIG. 1. As with the embodiment of FIG. 2, elapse of the first delay interval will result in closure of the contacts 42 and 44 by the coil 40 of the first timer relay. Closure of the contacts 44 provides a signal to the solenoid 88 to open the gate valve 108. If the return sensor 101 is attempting to open the vanes 12 with a signal on the pneumatic pilot line 100, air will be admitted through the gate 108 and the check valve 110 to operate the piston 124 to open the valve further. At the end of the first delay interval, however, the contacts 44 will open, thereby disabling the solenoid 88 and shutting the gate valve 108.

Operation of the duty cycle timer 21, in the embodiment of FIG. 3 as in the embodiment of FIG. 2, produces an initial load signal and recurring signals. These signals are pneumatic signals corresponding to the electrical signals 94 and 96, respectively, indicated in FIG. 6. The pneumatic increments of pressure will be applied to the piston 124 until the temperature of the chilled water falls sufficiently. This will result in a decrease in pressure on the pneumatic pilot line 100. If the pressure in the pneumatic pilot line 100 drops below the pressure in the buffer air tank 118, air will be exhausted from the pneumatic control loop 104 and the air tank 118 through the check valve 116 until the pressures in the pneumatic air tank 118 and the pneumatic pilot line 100 are equal. The reduction in pressure will move the piston 124 in the opposition direction to close vanes 12. A pressure reduction in the pneumatic pilot line 100 thereby corresponds to an unload signal on the unload line 29 in FIG. 1.

It can be seen that various alterations and modifications to the embodiments of the invention depicted are possible without departing from the scope of the invention. For example, an opposite electrical polarity system could be applied to the relays depicted in FIG. 1, and an inversely proportional pneumatic signal could be applied to the pilot line 100 of FIG. 2, with appropriate modifications to the valve and gating arrangement depicted. Also, the switch 30 of the return water sensor 28 can be conditioned to close either when the returning water reaches the temperature set point or when it exceeds the temperature set point. In either event, closure of the switch 30 in the embodiment of FIG. 1 corresponds to a temperature above the set point temperature, while the opposite open switch condition corresponds to a temperature below the set point temperature. Accordingly, the scope of the invention should not be construed as limited to the embodiments depicted in the drawings, but rather is defined in the claims appended hereto.

I claim:

1. A timing circuit for an air conditioner compressor for compressing a coolant to cool a recycling heat transfer fluid employing restriction means that governs the supply of coolant to said compressor by opening to increase coolant supply to said compressor and by closing to reduce coolant supply to said compressor comprising:

an initial timing means responsive to initial power loading of said compressor to arrest the operation of said restriction means to limit coolant supply to said compressor to a minimum level during an initial timing interval, a return sensor providing opposite signals above and below a setpoint temperature and arranged to monitor temperature of said recycling heat transfer fluid as it returns to thermal communication with said coolant, and duty cycle timing means operative in response to signals from said return sensor corresponding to temperatures above said setpoint temperature to intermittently open said restriction means, and inoperative in response to signals from said return sensor corresponding to temperatures below said setpoint temperature.

2. A timing circuit according to claim 1 further characterized in that said restriction means is driven by a motor having separate electrical lines to open and close said restriction means, and a compressor run indication signal line is provided carrying a run indication signal to indicate compressor operation, and said initial timing means comprises a timer operatively connected to said run indication signal line and connected to close a path in said electrical line for opening said restriction means, for the duration of said initial timing interval upon the appearance of said run indication signal, and to thereafter open said path.

3. A timing circuit according to claim 1 further characterized in that said initial timing means is a startup relay.

4. A timing circuit according to claim 3 further characterized in that said startup relay is conditioned to provide a delayed response and includes an adjustment pot to alter said initial timing interval.

5. A timing circuit according to claim 4 further characterized in that said pot is adjustable to vary said initial timing interval from between about 0.5 to about 100 seconds.

6. A timing circuit according to claim 1 further characterized in that said duty cycle timing means comprises first and second timers and said first timer is responsive after a first delay interval to said return sensor signal corresponding to temperatures above said setpoint to open said restriction means and also to actuate said second timer, and said second timer deactivates said first timer after a second delay interval.

7. A timing circuit according to claim 6 further characterized in that said first and second timers include first and second relays with contacts connected to open and close circuits from said return sensor to each other, and said first relay has a contact connected to open and close said restriction means.

8. A timing circuit according to claim 7 further characterized in that said first and second relays each include adjustable pots to respectively vary said first and second delay intervals.

9. A timing circuit according to claim 8 further characterized in that said pot of said first relay is adjustable to vary said first delay interval from between about 100 and about 300 seconds.

10. A timing circuit according to claim 8 further characterized in that said pot of said second relay is adjustable to vary said second delay interval from between about 0.5 and about 15 seconds.

11. A timing circuit according to claim 6 further comprising a load indicator connected to operate in parallel with said second timer.

12. A timing circuit according to claim 1 further characterized in that said restriction means is driven by a pneumatic control comprising a cooling sensor for monitoring initial temperature of said recycling heat transfer fluid as it leaves thermal contact with said coolant, and a pneumatic pilot line coupled to control said restriction means and operated by said cooling sensor at a pressure proportional to said initial temperature of said recycling heat transfer fluid, a pneumatic control loop interposed in said pilot line and including check valve means to limit pneumatic flow to a single direction in said control loop, gate valve means to open and close said control loop, and a solenoid connected for operation by said initial timing means and by said duty cycle timing means to operate said gate valve means.

13. A timing circuit according to claim 12 further comprising an adjustable restriction valve located in said pneumatic control loop and a pneumatic buffer connected to said pneumatic control loop.

14. A timing circuit according to claim 12 further comprising a run indication signal line carrying a run indication signal to indicate compressor operation, and said initial timing means comprises a timer operatively connected to said run indication signal line and connected through an electrical path to operate said solenoid to arrest any opening of said pneumatic control loop for the duration of said initial timing interval upon the appearance of said run indication signal, and to thereafter release said solenoid.

15. A timing circuit according to claim 12 further characterized in that said duty cycle timing means comprises first and second timers and said first timer is responsive after a first delay interval, to said return sensor signal corresponding to temperatures above said setpoint thereof to operate said solenoid through an electrical path to open said pneumatic control loop and also to actuate said second timer, and said second timer deactivates said first timer after a second delay interval.

16. A timing circuit according to claim 15 further comprising an electrical bypass line connected to said return sensor and responsive to said return sensor signal corresponding to a temperature above said setpoint thereof to operate said solenoid, and manually operable disabling means controlling said bypass line to alternatively disable said bypass line and to bypass said duty cycle timing means.

17. A timing circuit according to claim 1 further comprising a bypass indicator connected in series with said initial timing means.

* * * * *